United States Patent
Edgar et al.

(10) Patent No.: US 10,165,197 B2
(45) Date of Patent: Dec. 25, 2018

(54) SYSTEM AND METHOD FOR PROCESSING AN IMAGE CARRIED BY AN OPTICAL SUBSTRATE AND COMPUTER READABLE MEDIUM MADE USING SAME

(71) Applicants: Albert Durr Edgar, Austin, TX (US); Michael Charles Wilder, Austin, TX (US); Martin Potucek, Austin, TX (US); Darryl Ray Polk, Austin, TX (US)

(72) Inventors: Albert Durr Edgar, Austin, TX (US); Michael Charles Wilder, Austin, TX (US); Martin Potucek, Austin, TX (US); Darryl Ray Polk, Austin, TX (US)

(73) Assignee: Astral Images Corporation, Austin, TX (US)

( * ) Notice: Subject to any disclaimer, the term of this patent is extended or adjusted under 35 U.S.C. 154(b) by 642 days.

(21) Appl. No.: 14/073,768

(22) Filed: Nov. 6, 2013

(65) Prior Publication Data
US 2014/0132752 A1   May 15, 2014

Related U.S. Application Data

(60) Provisional application No. 61/725,075, filed on Nov. 12, 2012.

(51) Int. Cl.
*H04N 5/253* (2006.01)
(52) U.S. Cl.
CPC .................................. *H04N 5/253* (2013.01)
(58) Field of Classification Search
CPC ...................................................... H04N 5/253
USPC ............................................................ 348/97
See application file for complete search history.

(56) References Cited

U.S. PATENT DOCUMENTS

| | | | | |
|---|---|---|---|---|
| 6,437,358 B1 * | 8/2002 | Potucek | ............. | H04N 1/00795 250/559.07 |
| 6,498,867 B1 * | 12/2002 | Potucek | ............. | H04N 1/00092 356/237.2 |
| 6,720,560 B1 * | 4/2004 | Edgar | ................ | H04N 1/00002 250/339.11 |
| 6,924,911 B1 * | 8/2005 | Ford | ........................ | H04N 1/04 358/475 |
| 2003/0147562 A1 * | 8/2003 | Damm | ...................... | G06T 5/50 382/275 |
| 2008/0204736 A1 * | 8/2008 | Chikamatsu | ....... | G01N 21/9501 356/237.4 |
| 2016/0153772 A1 * | 6/2016 | Jeong | ................. | G01B 11/2531 356/610 |

* cited by examiner

*Primary Examiner* — Farzana Hossain
(74) *Attorney, Agent, or Firm* — David O. Simmons; IVC Patent Agency

(57) ABSTRACT

A system for digitizing an image from an optical substrate having at least a first defect comprises a digital image capture device, a first light source positioned at a first position relative to the digital image capture device, and a second light source positioned at a second position relative to the digital image capture device. The second position is offset with respect to the first position. Light emitted from the first and second light sources are combined at a light receiving portion of the digital image capture device for causing the first defect to be nullified from a composite digital representation of the image that is generated using information outputted from the digital image capture device.

12 Claims, 10 Drawing Sheets

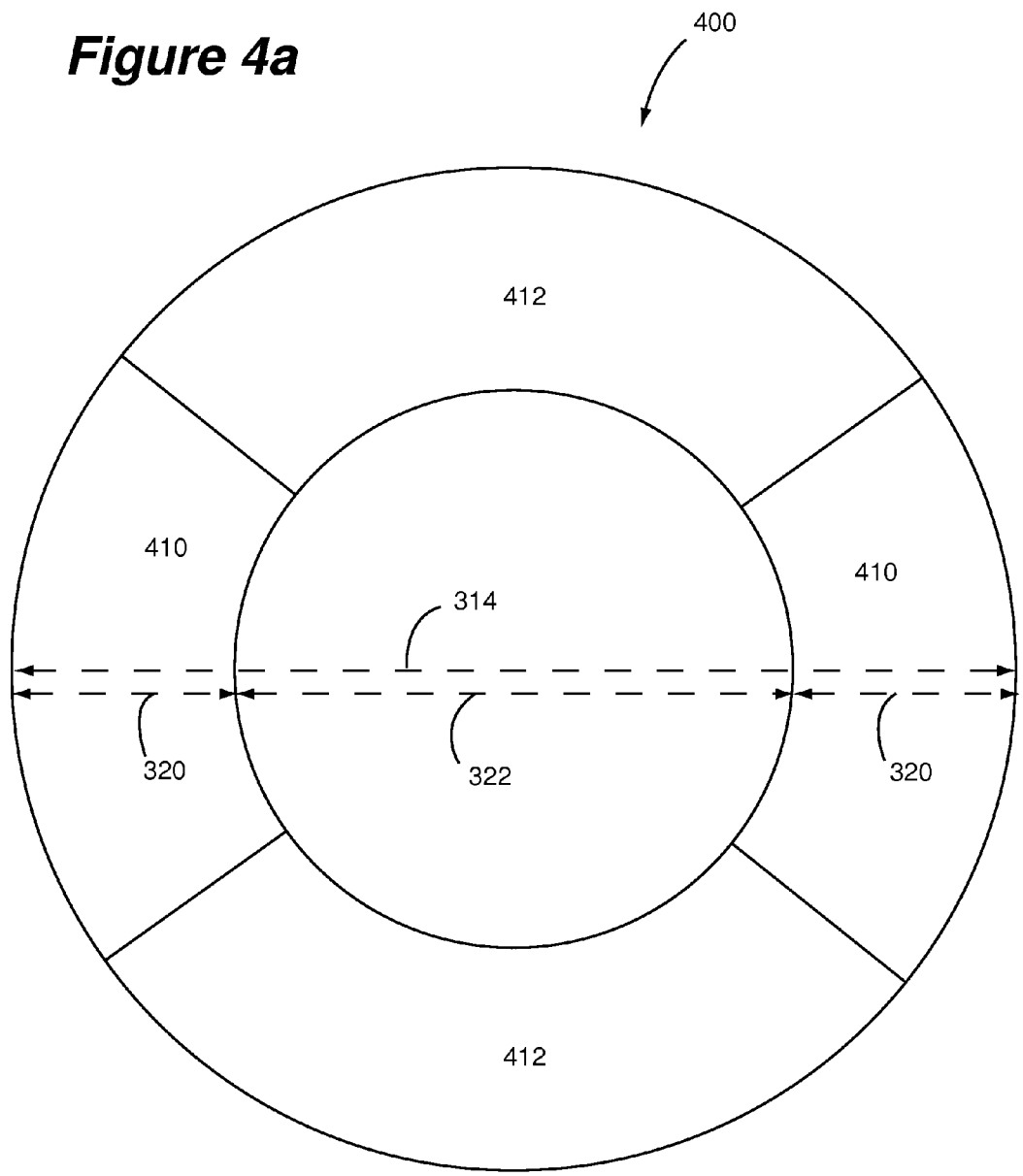

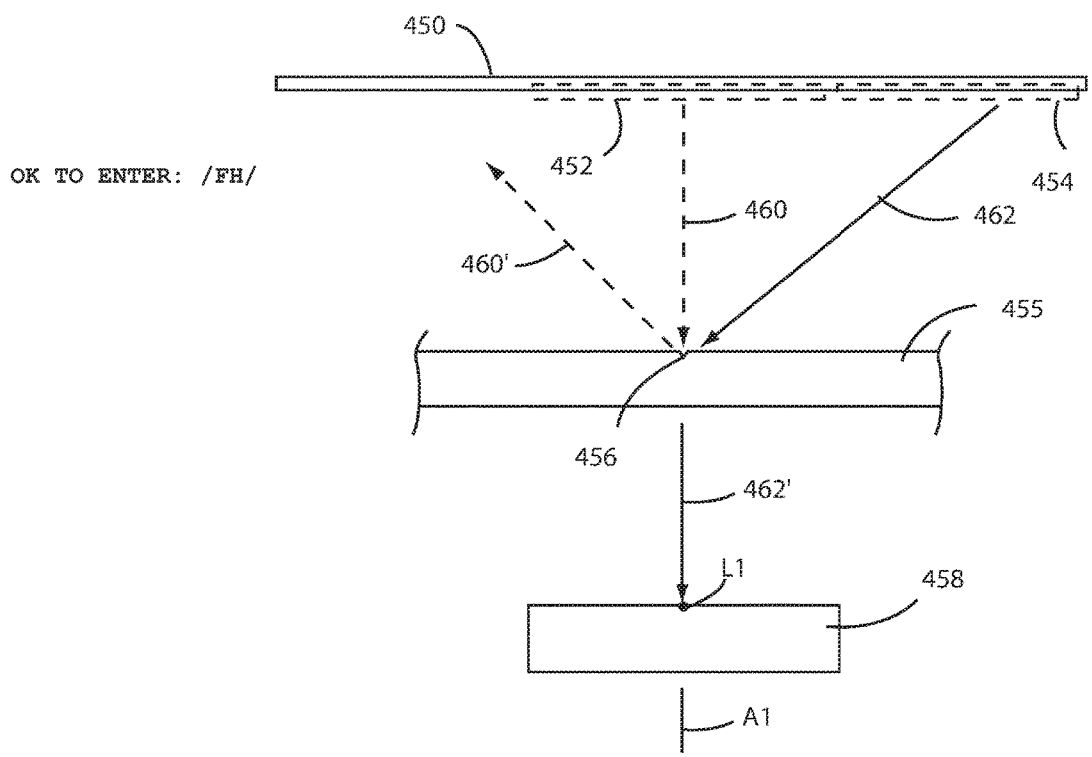

SYSTEM AND METHOD FOR PROCESSING AN IMAGE CARRIED BY AN OPTICAL SUBSTRATE AND COMPUTER READABLE MEDIUM MADE USING SAME

CROSS REFERENCE TO RELATED APPLICATIONS

This patent application claims priority from U.S. Provisional Patent Application having Ser. No. 61/725,075, filed 12 Nov. 2012, entitled "METHOD AND SYSTEM FOR REDUCING THE APPEARANCE OF SURFACE DEFECTS FROM DIGITAL IMAGES SCANNED FROM FILM", having a common applicant herewith and being incorporated herein in its entirety by reference.

FIELD OF THE DISCLOSURE

The disclosures made herein relate generally to systems and methods for creating a digital representation (e.g., a copy) of content (e.g., one or more images) carried by an optical substrate (e.g., film) and, more particularly, to systems and methods for reducing the appearance of surface defects in a digital copy of an image scanned from an optical substrate.

BACKGROUND

The historical image heritage of most societies, industries and individuals is on film (e.g., motion picture film defining a displayable visual experience (e.g., a movie)). A problem in retrieving content on this film is that surface defects on the film adversely impact (e.g., mar) the images held inside the film. Most of these defects, including scratches and dust, adversely impact the image by deflecting light rays by refraction.

It is a goal of a defect correction system to hide or remove defects found on the surface of the film from the scanned image without altering the image content contained within the film. Most of the systems in use today utilize software tools that analyze digital image content that has been generated by a digital film scanner that scans analog film images. The software tools often are inaccurate in identifying defects and usually require a decision by an operator to determine what pixels to erase and replace with similar content. These systems tend to be less than perfectly accurate as there is a tradeoff between eliminating suspected defects and eliminating image content that may look like a defect to a software program of a defect correction system.

Most software systems that operate upon digital images (i.e., a defect correction system) tend to repair only a small percentage of the total number of surface defects due to the high risk of false positive defect identification. Additionally, systems that require the scanning of film and subsequent operations by human operator using software systems tend to be expensive and thus have high cost structures. The high costs often make the current systems non-competitive when servicing a large film archive that needs preservation through digitization of the film in a library.

Therefore, a film imaging solution that both reduces the cost of preserving large film archives by generating digital images of the analog images in film and that implements defect correction for improving the quality of these digital images in a manner that overcomes shortcomings of known defect correction solutions would be advantageous, desirable and useful.

SUMMARY OF THE DISCLOSURE

Embodiments of the present invention are directed to reducing the appearance of surface defects in a digital copy of a scanned image from an optical substrate (e.g., film). More specifically, embodiments of the present invention are directed to an imaging digitizing solution that both reduces the cost of preserving large film archives by generating digital representations of the analog images carried by an optical substrate and that implements defect correction for improving the quality of these digital images in a manner that overcomes shortcomings of known defect correction solutions. Such an imaging digitizing solution will allow for the creation of an automated scanning and digital image rendering system that will eliminate nearly all defects in the digital images that were caused by surface defects of an optical substrate that interrupt light waves travelling from a light source to an image sensor through the optical substrate.

A system configured in accordance with an embodiment of the present invention is less expensive to operate and produce higher quality digital images that represent what is actually contained within an analog film or other type of optical substrate that is being preserved. As is described in detail below, a pure preservation system that captures just the image content and avoids the blemishes caused by surface defects will allow for the creation of an accurate and low cost digital master record of what was stored on the optical substrate originally. With a high-quality digital representation of the image content, a secure redundant digital archive can be created and the image content can be captured and preserved in digital form for future generations of viewers, researchers and the like.

The disclosures made herein are directed to removing or reducing the visual effect of surface defects captured in a digital file that resulting from scanning one or more images from an optical substrate. Advantageously, such removal of surface defects from the digital files that result from scanning the one or more images is provided through use of a hyper-diffused light source. As discussed below in detail, hyper-diffusion refers to a selective increase in light brightness in one region of an optical substrate scanner illumination apparatus than in an adjacent region thereof for the purpose of compensating for the distribution of light resulting from a surface defect. Thus, in reference to preferred embodiments of the present invention, a skilled person will appreciate that optical substrate is scanned with a hyper-diffused light source (i.e., a ratio between illumination intensity between two different illumination regions of the light source) that has an illumination profile that is adjusted to null out as many surfaced defects as possible. The light path goes through a field lens, through the optical substrate, and to a receiving sensor of a digital image capture device or apparatus.

In one embodiment of the present invention, a system for digitizing an image from an optical substrate having at least a first defect comprises a digital image capture device, a first light source positioned relative to the digital image capture device to emit at least some light that passes straight through the optical substrate to the image capture device, and a second light source positioned relative to the digital image capture device to emit at least some light that is deflected by the first defect to the image capture device. The first and second light sources in conjunction with the digital image capture device are configured to combine light so as to nullify the first defect from the image captured by the digital image capture device.

In another embodiment of the present invention, a system for capturing an image from optical substrate having at least a first defect, comprises a digital image capture device, a first light source positioned at a first position relative to the digital image capture device, and a second light source positioned at a second position relative to the digital image capture device. The second position is offset with respect to the first position. Light emitted from the first and second light sources are combined at a light receiving portion of the digital image capture device for causing the first defect to be nullified (e.g., visual appearance to reduced or eliminated) from a composite digital representation of the image that is generated using information outputted from the digital image capture device (e.g., an image captured while both light sources illuminated or two or more images captured for two or more different illumination combinations for the light sources).

In another embodiment of the present invention, a system for digitizing an image carried by an optical substrate comprises a digitizing apparatus for converting the image carried by the optical substrate to a corresponding digital representation of the image; and an illumination apparatus for generating light and directing the light onto the optical substrate. The illumination apparatus includes a first plurality of light sources defining a central illumination region of the illumination apparatus and a second plurality of light sources defining a perimeter illumination region of the illumination apparatus. Each one of the light sources is spaced apart from each other one of the light sources such that each one of a plurality of locations on a light receiving surface of the optical substrate is exposed to a plurality of light rays from each one of the light sources.

In another embodiment of the present invention, a digital optical substrate scanner system has an optical substrate illumination apparatus. The optical substrate illumination apparatus comprises a plurality of light sources distributed amongst a plurality of illumination regions. A first one of the illumination regions includes a first plurality of light sources that jointly emit light of a first illumination intensity. A second one of the illumination regions includes a second plurality of light sources that jointly emit light of a second illumination intensity substantially greater than the first illumination intensity. The second one of the illumination regions is located at least partially outside of an area of the first one of the illumination regions.

In another embodiment of the present invention, a digital optical substrate scanner system has an illumination apparatus. The illumination apparatus comprises a plurality of light sources distributed amongst a plurality of illumination regions. A first one of the illumination regions emits a first light pattern. A second one of the illumination regions produces a second light pattern. The second light pattern is at least partially outside of an area defined by the first light pattern.

In another embodiment of the present invention, a digitizing optical substrate scanner system comprises a digitizing apparatus for converting an image carried by an optical substrate to a corresponding digital representation of the image, an illumination apparatus for projecting light onto the optical substrate, and an optical substrate handling apparatus for transporting the optical substrate relative to the digitizing apparatus along a path that extends between the digitizing apparatus and the illumination apparatus. The illumination apparatus includes a plurality of coaxially arranged illumination regions. A first one of the illumination regions emits a light pattern of a first illumination intensity. A second one of the illumination regions produces a light pattern of a second illumination intensity substantially different than the first illumination intensity. A first side of a portion of the optical substrate at a digitizing position between the digitizing apparatus and the illumination apparatus is exposed to an image capturing portion of the digitizing apparatus and a second side of the portion of the optical substrate at the digitizing position is exposed to a light emitting portion of the illumination apparatus.

In another embodiment of the present invention, a method for nullifying a visual appearance of a defect at an image carried by an optical substrate within a digitally generated representation of the image comprises causing the defect to be expose to light rays emitted from a first light source that is located away from a first side of the optical substrate at a first location, causing the defect to be expose to light rays emitted from a second light source that is located away from a first side of the optical substrate at a second, and generating at least one digital representation of the image while the defect is exposed to the light of each one of the light sources.

In another embodiment of the present invention, a method for digitizing an image carried by an optical substrate comprises positioning the image carried by the optical substrate within a field of view of a digital image capture device, exposing the image to light from a first light source that is located away from a first side of the optical substrate at a first location, exposing the image to light from a second light source that is located away from the first side of the optical substrate at a second location different than the first location, and activating the digital image capture device while exposing the image to the light of each one of the light sources for generating at least one digital representation of the image while the image is exposed to the light of each one of the light sources.

In another embodiment of the present invention, a non-transitory computer-readable medium having tangibly embodied thereon and accessible therefrom processor-interpretable information defining a displayable visual experience. The processor-interpretable information comprises a plurality of images in a digital format each generated from a respective one of a plurality of images carried by an optical substrate. Each one of the images is generated using a method comprising positioning the respective one of the images carried by the optical substrate within a field of view of a digital image capture device, exposing the respective one of the images to light from a first light source that is located away from a first side of the optical substrate at a first location, exposing the respective one of the images to light from a second light source that is located away from the first side of the optical substrate at a second location different than the first location, and activating the digital image capture device while exposing the respective one of the images to the light of each one of the light sources for generating at least one digital representation of the respective one of the images while the respective one of the images is exposed to the light of each one of the light sources.

These and other objects, embodiments, advantages and/or distinctions of the present invention will become readily apparent upon further review of the following specification, associated drawings and appended claims.

BRIEF DESCRIPTION OF THE DRAWINGS

FIG. 1b is a diagrammatic view showing a defect scattering light distribution for the prior art film scanning system of FIG. 1a.

FIG. 4a is a diagrammatic view showing an illumination apparatus configured in accordance with an embodiment of the present invention.

FIG. 4b is a diagrammatic view showing light deflection-replacement functionality in accordance with an embodiment of the present invention.

DETAILED DESCRIPTION

Figure 1A:
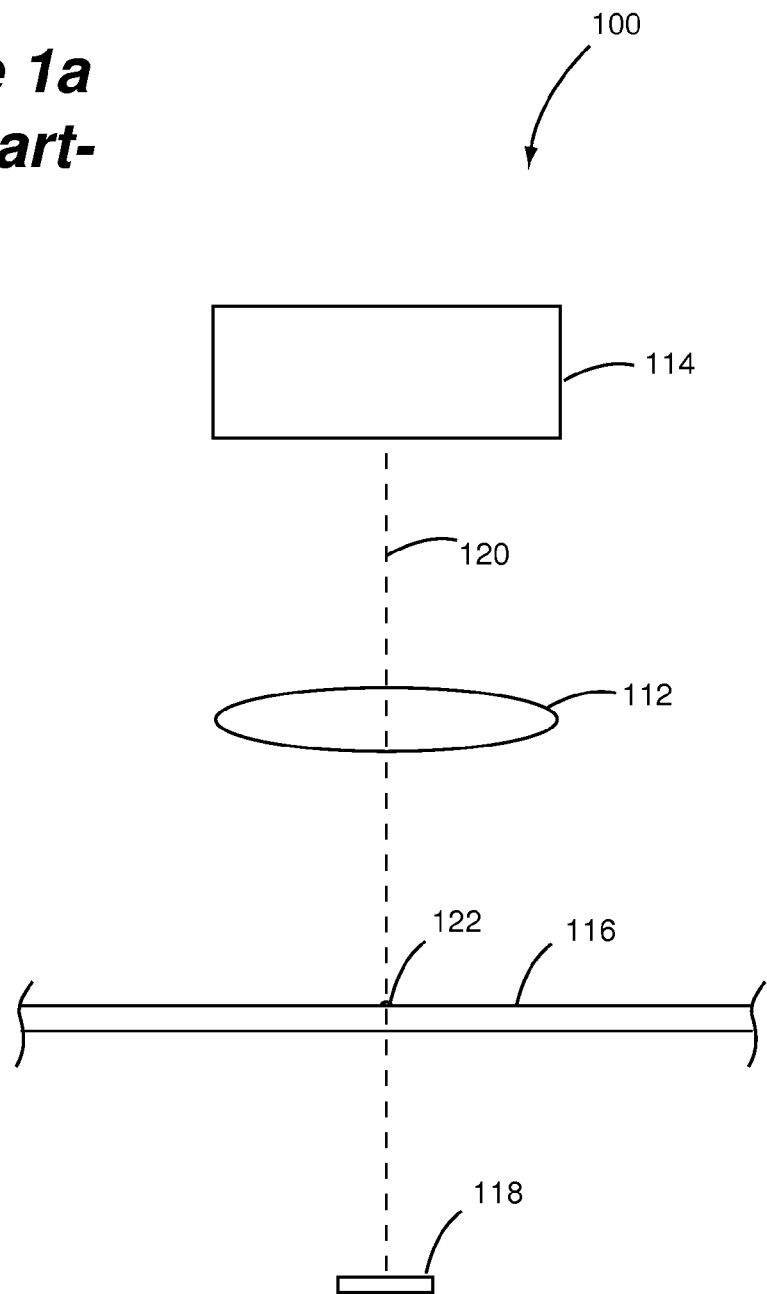
FIG. 1a is a diagrammatic view showing a prior art film scanning system.
Figure 1B:
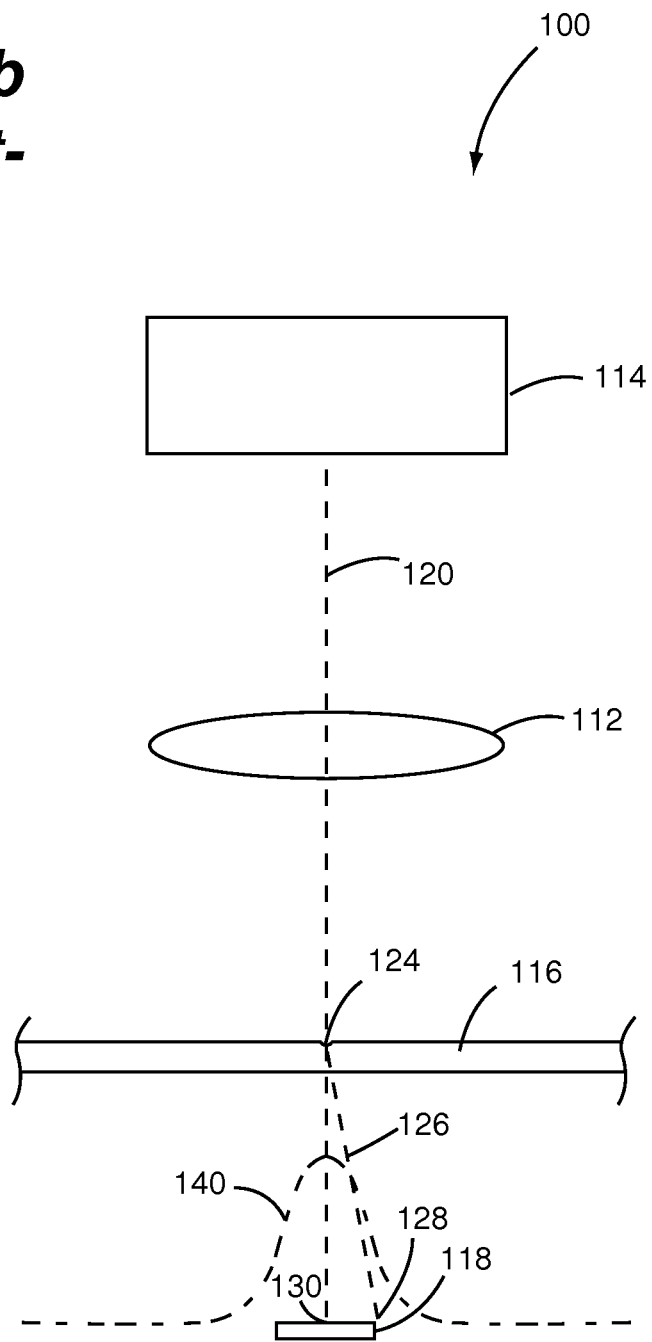

FIGS. 1a and 1b each show a prior art film viewing (i.e., optical substrate scanning) system 100 that includes a camera lens 112, a sensor 114, a film 116, and a light source 118 (i.e., a prior art light source). A ray of light (i.e., light ray 120 or the ray) at the center of lens 112 connects (i.e., optically couples) the sensor 114 with the light source 130. As shown in FIG. 1b, the light ray 120 is modulated by the film 116 to read an image density at a select pixel 122 at which the film 116 intercepts the light ray 120. As also shown in FIG. 1b, the film 122 has a defect 124 that attenuates or scatters light of the light ray 120 that is received by sensor 114 through the same path. The defect 124 (i.e., a surface defect) at the pixel 124 redirects some of the light of the light ray 120 (i.e., energy thereof) between the sensor 114 and the light source 118 to a different angle that defines a deflected light path 126. The deflected light that intersects the light source 118 at an offset (i.e., different) point 128 from the intersection point 130 of the light ray 120 and the light source 118. Overlaid on the image is a possible probability distribution 140 for the scattering of the light path caused by the defect 124. If the offset point 128 is dark, the defect 124 will be seen by the sensor 114 as being dark. By extension, if offset point 128 is lighter than intersection point 130, the sensor 114 will see a light-colored defect (e.g., if the offset point 128 is red the defect will appear red, etc).

Figure 1C:
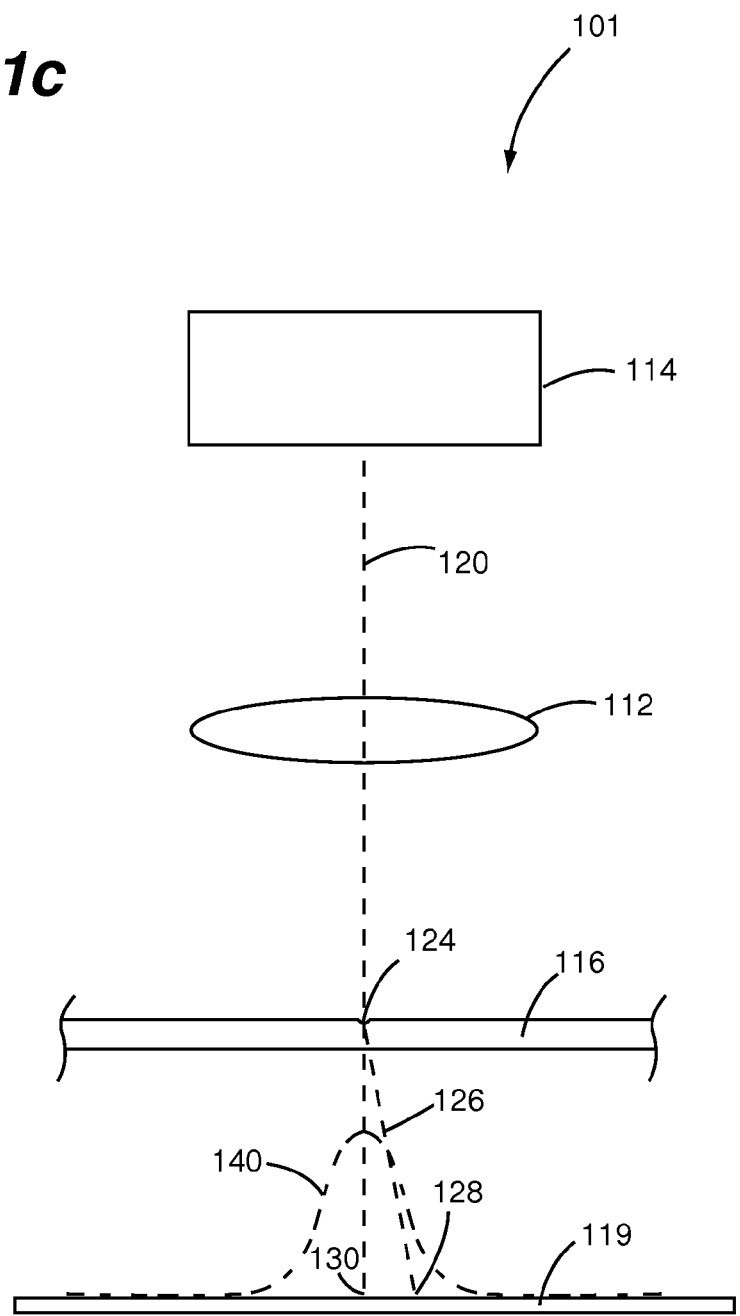
FIG. 1c is a diagrammatic view showing light diffusion for a film scanning system in accordance with an embodiment of the present invention.
Figure 1D:
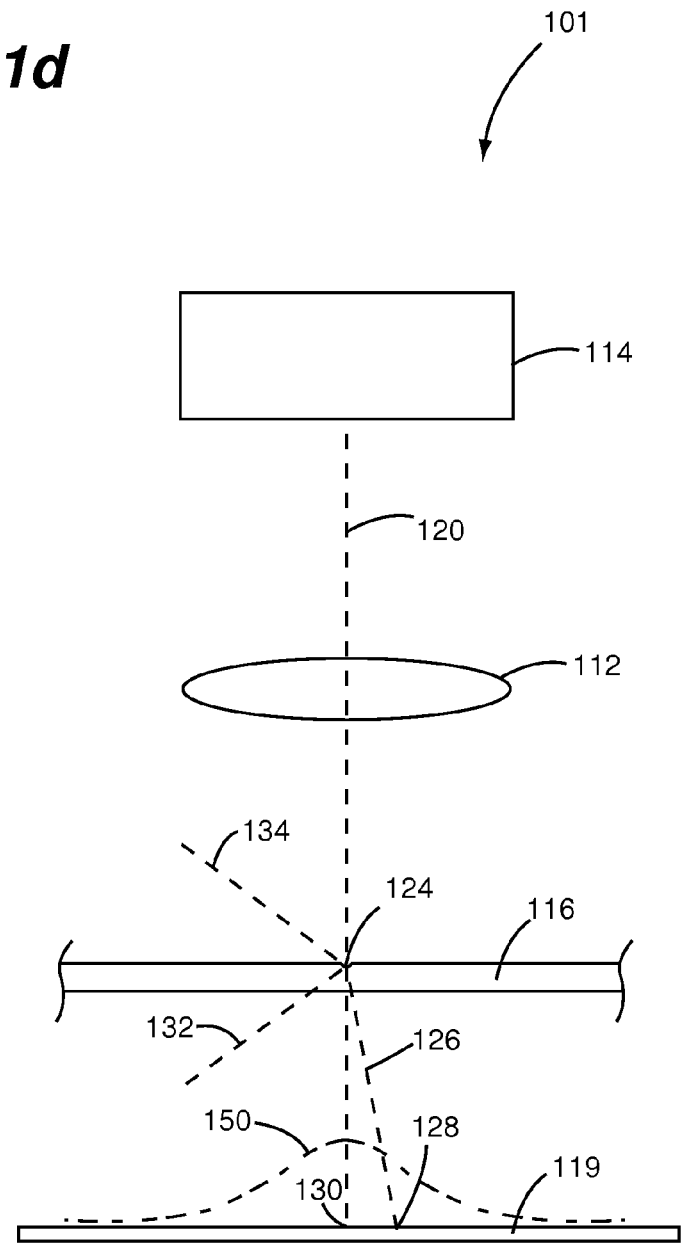
FIG. 1d is a diagrammatic view showing a defect scattering light distribution for the film scanning system of FIG. 1c.

FIGS. 1c and 1d shows a uniform diffused light source (i.e., the diffused light source 119) configured in accordance with an embodiment of the present invention, which is used in place of the prior art light source of the film viewing system 100 of FIGS. 1a and 1b, thus producing an improved film viewing system 101. The diffused light source 119 of the improved film viewing system 101 is larger in area than the conventional light source 130 shown in FIGS. 1a and 1b. Furthermore, a width of the diffused light source 119 is greater than a width of the camera lens 112. For example, a diameter of the diffused light source 119 is greater than a diameter of the camera lens 112 and a diameter of the diffused light source 119 is greater than a maximum imaged width (i.e., portion having images thereon) of the film 116.

FIG. 1d shows a deeper defect 125 in the film 116 and illustrates what happens when diffusion of the diffused light source 119 is not enough to compensate fully for the effect of the deeper defect 125. The sensor 114 receives light rays from the illumination of the diffused light source 119 but also receives light rays from beyond the illumination of the diffused light source 119 that are dark because of the deeper defect 125. In this regard, the attenuation caused by the defect 124 (or the deeper defect 125) can be thought of as the accumulation of all the light rays reflected and diffracted by the defect 124 (or the deeper defect 125) that are received by the sensor 114.

The larger area of the diffused light source 119 causes the defect 124 to be less visible because use of the diffused light source 119 causes the sensor 114 to receive an accumulation of light rays that hits the defect 124. The deflected light path 126 from the sensor 114 through the film 116 will have traces that would intercept the diffused light source 119. For example, some of the light ray 120 from the offset point 128 could compensate for the light lost through the deflected light path 126. A light ray traced back from the sensor 114 has a certain scattering probability because of the defect 124. If the uniform illumination 118, shown in FIG. 1b, encompasses this probability spread, then the sensor 114 will receive the equivalent of the light ray 120 that did not pass through any defect as in FIG. 1a. If the light diffusion is greater than the scattering from the defect 124, the defect becomes invisible.

It is a goal of a defect correction system configured in accordance with the present invention (e.g., the improved film viewing system 101) to hide the effects of surface defects on an optical substrate such as, for example, film. This will be done by intercepting as many of the light rays as possible, such as those corresponding to a plurality of offset points 128 in FIG. 1c, by compensating for non-interceptable light rays such as wide-angle 132 or backscattered 134 in FIG. 1d by increasing light born by interceptable ray 126 to compensate, and by using the ratio of light scattered at different interceptable angles (e.g., the angle associated with the light path 120 and the angle associated with the deflected light path 126) to estimate the light lost by non-interceptable rays (e.g., the light angles 132 and 134 in FIG. 1d) and fill in that light by increasing the sensitivity to other light rays associated with that pixel.

Figure 2:
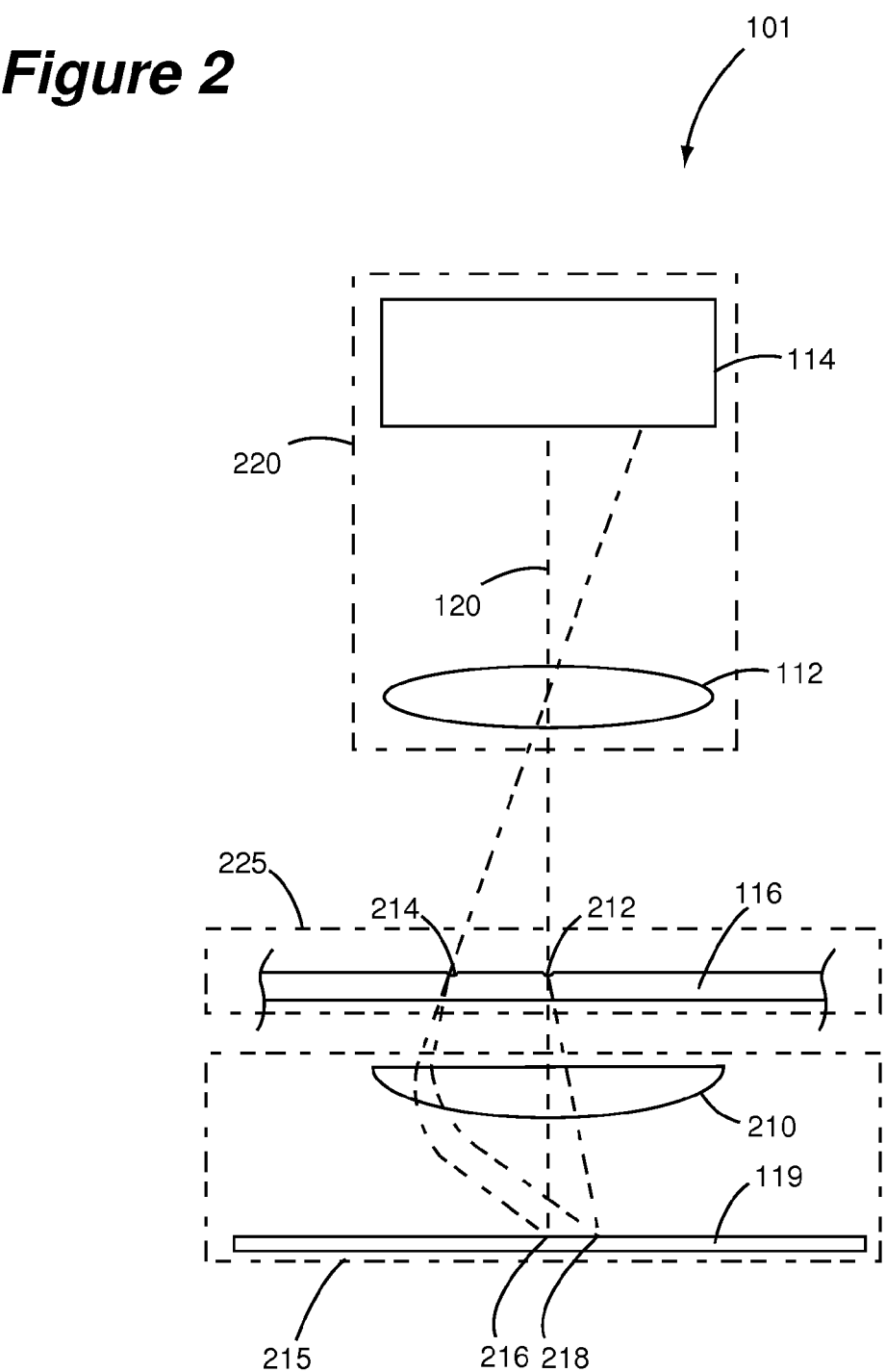
FIG. 2 is a diagrammatic view showing the optical effect of inclusion of a field lens in the film scanning system of FIGS. 1c and 1d.

Referring now to FIG. 2, a lens 210 is added to the improved film viewing system 101 of FIGS. 1c and 1d. The purpose of the lens 210 is to enable equivalent action across the field of the film 116. In this regard, the lens 210 is referred to herein as a field lens (i.e., the field lens 210). An illumination apparatus 215 in accordance with the present invention (FIG. 2) comprises the diffused light source 119 and the field lens 210. The improved film viewing system 101 includes a digitizing apparatus 220 for converting an image carried by the film 116 to a corresponding digital representation of the image and a film handling apparatus 225 for transporting the film 116 relative to the digitizing apparatus 220 along a path that extends between the digitizing apparatus 220 and the illumination apparatus 215. A skilled person will appreciate various implementations of the digitizing apparatus 220 and the film handling apparatus 225 based on prior art implementations of such.

Light rays between the sensor 114 and the diffused light source 119, which interrogates the film at two points each with two identical defects 212 and 214, will both impinge on the diffused light source 119 at a common point 216 as the primary ray, and a offset (i.e., different) common point 218 for the deflected ray. The field lens 210 is used to apply the principles of the present invention across a field encompassing an entire image of the film 116 (i.e., a maximum imaged width of the film 116), rather than at a single pixel of the image.

Presented now is detailed information in regard to the principles of the present invention. The maximum angle at which an object is illuminated, and therefore for which light diffracted by a defect can be intercepted by the light source, is often quantified as the "numerical aperture" of the light source. In photography, the "speed" of a lens is normally described as the "f-stop", defined as the focal length of the lens divided by the diameter. The problem is that it is theoretically possible to have a near infinitely wide lens close to a sensor, but that does not yield near infinite light. Imagine a person is under a uniformly overcast sky in a house with a skylight that is 1 foot wide and 8 feet above the floor. The f-stop of the skylight is a familiar f8. Now, if on the other hand the skylight was 2 feet wide, the f-stop would be 8/2=f4 and the person could read a book with 4× the light, f8/f4 squared. However, if the ceiling and walls are removed, the sky is now almost infinitely wide so the f-stop now approaches f0 but the book is not illuminated with near infinite light. The reason that the book is not illuminated with near infinite light is that light near the horizon of the sky is less efficient. In fact, overhead illumination (i.e., the illuminating canopy) can be through of as a hemisphere rather than a flat surface. The light outside (i.e., without the ceiling and walls) would be the equivalence of f0.5, despite calculating to f0. For a large f-stop, a numerical aperture "NA"=1/(2 times f) and f=1/(2 times NA). However, for a small f-stop, geodesic elements predominate so the limit is NA=1.0 for illumination encompassing 180 degrees=plus/minus 90 degrees. Note that a solid steradean angle and, thus, "brightness" under uniform illumination is proportional to the square of NA.

Figure 3:
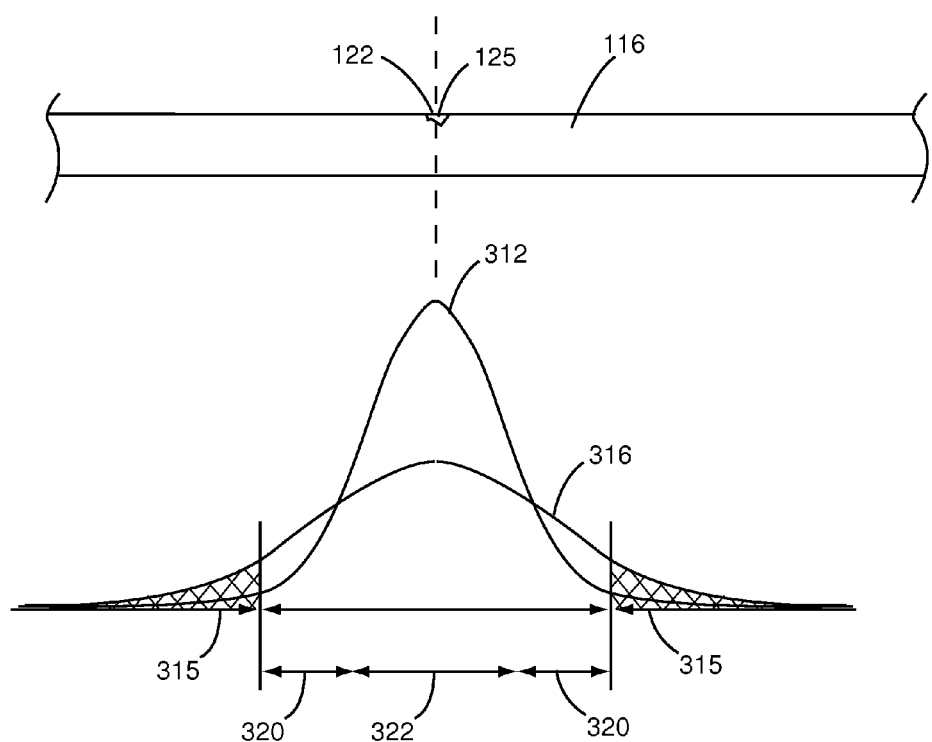
FIG. 3 is a diagrammatic view showing a probability distribution curve associated with different size defects.

A skilled person will understand that an actual image is the confluence of many rays of light (i.e., light rays). Each of these light rays will be diffracted differently and in a sense randomly by a defect. Holistically, the diffraction of light rays by a known (e.g., prototype) defect may be considered as deflecting to a probability distribution across a light source rather than deflection to a single point. FIG. 3 shows such a probability distribution as a curve (i.e., a first probability distribution curve 312). Although the field lens 210 is not shown in FIG. 3 for simplicity because only a select pixel (i.e., pixel 122) is illustrated, the field lens 210 is preferably used in practice for equivalent functioning of pixels that are not perfectly centered on the film 116.

The angle that can be intercepted by an illumination apparatus is limited, as illustrated by illumination range 314 of FIG. 3. As discussed above, without immersion, the physical limit is less than NA=1.00. In fact, practical limits are imposed by the physical size of field lens 210 and needed separation between the physical gate holding the film 116 and the field lens 210. Accordingly, a practical maximum NA is around 0.7.

As shown in FIG. 3, for a nominal defect (e.g., the defect 124 in FIGS. 1b and 1c) at a location of a select pixel 122 (i.e., the defect entirely or partially in place of the select pixel 122), the first probability distribution curve 312 is virtually encompassed by the illumination range 314, and so that all light rays as seen by the scanner sensor (e.g., sensor 114 in FIGS. 1a-1d) map to actual points on the light source of the illumination apparatus (e.g., the diffused light source 119 in FIGS. 1c and 1d) and the defect functionally disappears. However, a deeper defect (e.g., the defect 125 in FIG. 1d) may have a second probability distribution curve 316. A part of the distribution 316 is within the angle of the illumination range 314. However, another part shown by the cross-hatched area in FIG. 3 is outside of the illumination range 314 (i.e., is within the non-illuminated region 315). This non-illuminated region 315 (i.e., the area that is outside of illumination range 314) maps to dark (e.g., black), un-illuminated points and will cause that deeper defect to be partially darkened. Note that, for any illumination, there will be defects shallow enough to disappear and deeper defects will be darkened. A wider angle of light for illumination range 314 will always hide more defects. However, there are both practical and absolute limits to a maximum width of a light source used for film scanning.

As shown in FIG. 4a, an illumination apparatus 400 configured in accordance with an embodiment of the present invention has its available light angle 314 divided into two illumination regions—a perimeter illumination region 320 and a center illumination region 322 that is encompassed by the perimeter illumination region 320. Thus, in this embodiment, the perimeter illumination region 320 is in the shape of a ring that produces a light pattern having a generally ring shaped light pattern and the center (i.e., central) illumination region 322 that is in the shape of a circle that produces a light pattern having a generally circular shaped (i.e., round) light pattern. In at least one embodiment, the different illumination regions 320, 322 can each comprise a plurality of discrete light devices (e.g., a plurality of light emitting diodes that each include a light diffusing lens). It is also disclosed herein that a light source can include a plurality of discrete light emitting devices.

As discussed below in greater detail, the center illumination region 322 is primarily associated with an original angle of light rays of the illumination range 314 and the perimeter illumination region 320 is primarily associated with wider angles of light rays of the illumination range 314. The field lens 210, the perimeter illumination region 320, and the center illumination region 322 all share a common central axis CA. In this respect, the perimeter illumination region 320 and the center illumination region 322 are coaxially arranged with respect to each other (i.e., the perimeter illumination region 320 and the center illumination region 322 share the common central axis CA). However, it is disclosed herein that embodiments of the present invention are not limited to a particular shaped central illumination region and perimeter illumination region and are not limited to the perimeter illumination region encompassing the central illumination region. For example, the perimeter illumination region can partially overlap an area defined by the central illumination region and can be configured such that it does no fully encompass the central illumination region.

In the technique previously referred to herein as "hyper-diffusion", the brightness of perimeter illumination region 320 is increased above that of center illumination region 322 (i.e., the perimeter illumination region 320 has an illumination intensity greater than the illumination intensity of the center illumination region 322). In one embodiment, light intensity refers to a quantification of photons such as on a per unit area basis or on a per region basis. It is disclosed herein that embodiments of the present invention are not limited to a particular means by which the illumination intensity of the perimeter illumination region 320 is made to be greater than the illumination intensity of the center illumination region 322. Examples of such means include, but are not limited to, a relative quality of light emitting devices (e.g., light emitting diodes (LEDs) of a particular color) used in each one of the illumination regions, a relative level of power applied to the light emitting devices used in each one of the illumination regions, and the like.

The additional amount of light in the perimeter illumination region 320 compensates for the distribution of the deeper scratches that are outside the illumination range 314. It should be noted that the brightness of center illumination region 322 is what is seen through a pixel of film with no defect. For a pixel of film with a deep defect represented by distribution curve 316 shown in FIG. 3, it is apparent that the brightness of perimeter illumination region 320 (i.e., a hyper-bright illumination region of the diffused light source) can be increased such that the extra light intercepted by the diffusion curve 316 over perimeter illumination region 320 makes up for the light also lost by the non-illuminated illumination regions 316 outside the available illumination angle, thereby causing the defect to disappear (i.e., to be nulled). Note further that in this illustration, a lighter defect, which his represented by distribution curve 312 shown in FIG. 3, will intercept so little of the extra light from the perimeter illumination region 320 so as to have minimal change in the already virtually invisible shallower defect.

Advantageously, it has been discovered that, in practice in preferred embodiments but not all embodiments, the numerical aperture of center illumination region 322 is approximately equal to or greater than 50% of the illumination range 314 (i.e., total plan area of the diffused light source). A preferred (e.g., implementation-specific optimum) numerical aperture of center illumination region 322 relative to the total region 314 for many systems is around 71%, depending on the relative importance of correction at the center of the image field verses consistency across the image field, and control of aberrations in the lens system.

Accordingly, it is disclosed herein that extra brightness is assigned to the perimeter illumination region (e.g., an outside ring such as perimeter illumination region 320) in order to best null an average of defects. Shallower defects are optimized with less extra brightness, but deeper defects are optimized with more. Surface dust particles null at slightly different levels than do scratches. Accordingly there is no perfect balance, only an ensemble optimum. As previously disclosed, for certain implementations, it has been discovered that with a system where the numerical aperture of the center illumination region 322 is 71% of the total area of a light emitting area of the light source (i.e., the steradean area of the inner circle and the perimeter illumination region 320 are equal), optimization occurs when the perimeter illumination region 320 has an illumination intensity (e.g., brightness on a per unit area basis) that is significantly greater than that of the center illumination region 322. In general, this means that the total additional light in the perimeter illumination region 320, divided across all area of the perimeter illumination region 320 equals the total light across the entire available area before the addition, divided by 2. In other words, the total illumination into the integrated light fixture increases by optimally 50% and is in a range less than 100%. However, a skilled person will appreciate that the best defect nulling can be determined by examining the resulting image using different illuminations for the inner and outer area. It is disclosed herein that, in one embodiment, a relationship between the first illumination intensity and the second illumination intensity is represented by the illumination intensity of the perimeter illumination region 320 being about 1.5 to about 5 times (i.e., substantially greater than) the illumination intensity of the center illumination region 322, for example.

Referring to FIG. 4a, the configuration of the perimeter illumination region 320 and center illumination region 322 of the illumination apparatus 400 are shown. As can be seen, the perimeter illumination region 320 is in the shape of a ring and the center illumination region 322 is in the shape of a circle that is encompassed by the perimeter illumination region 320. The outside extent of the illumination range 314 is limited by the optics and should be large enough, if not slightly larger, than the angle allowed by the field lens 210. The other boundaries may, and optimally are, blurred, as the angles are not absolute and softening the edges minimizes abrupt changes leading to sparkle or speckle.

The illumination apparatus 400 can include more than two illumination regions. For example, as shown in FIG. 4a, the perimeter illumination region 320 can be subdivided into opposing horizontal illumination regions 410 and opposing vertical illumination regions 412. The brightness of the horizontal illumination regions 410 is specific to nulling vertical scratches. Vertical scratches occur along the length of the film, as the film is developed or scanned and something stationary drags across the moving film. Adding light to vertical illumination regions 412 relative to the horizontal illumination regions 410 will further control and null dust and scratches at other than vertical angles. However, these opposing vertical illumination regions 412 will have minimum effect on vertical lines. This separate control of vertical lines is important in film restoration because vertical lines are very common, and having a separate control to refine them compared to other defects will fine tune nulling. Accordingly, in view of the disclosures made herein, a skilled person will appreciate that a light-generating area of the illumination apparatus 400 can be further divided into more rings or angles for finer control and additional nulling.

If the center illumination region 322 were shrunk from a preferred amount (e.g., the numerical aperture of center illumination region 322 being about 50% to 71% of the total area of illumination range 314), and the outer illumination region of course expanded to fill the space, then the defect represented by diffusion curve 312 shown in FIG. 3 would intercept some of the extra light from an expanded perimeter illumination region 320. However, because the distribution curve 312 is substantially contained within the illuminated angle, there is substantially no lost light, and therefore the shallower defect of curve 312 will no longer be invisible, but will be overcorrected to turn lighter than the surrounding pixels, not darker. In general, when using a light source with perimeter and center illumination regions of different light intensity, each defect depth will have an ideal average nulling ratio of lighting between perimeter illumination region 320 and center illumination region 322, and at this compromise illumination ratio, deeper defects will tend to be under corrected and shallower defects will tend to be overcorrected.

It can be seen that the center illumination region 322 of the diffused light source 119 being too small is unacceptable because myriad small defects that would have been invisible with simple diffuse lighting will become visible with overcorrection. At first look, it appears that perimeter illumination region 320 should be as small as possible to best equalize the correction of small and large defects. Although this works best in theory, there are elements of reality that discourage this approach. First, the distribution curve is merely an ensemble average, and the light from a real single pixel will produce a more random, jagged curve. Getting too narrow with correction angles with abrupt changes will greatly emphasize "sparkle" or "speckle" as parts of a single defect are over or under corrected. A large deviation in intensity from a nulled defect for a pixel location we are defining as sparkle or speckle. Multiple illumination regions are useful for algorithm implementation where the relationships between the illumination regions can be determined. As stated earlier, a surface defect at that pixel location 325 shown in FIG. 3 redirects some of the light path from the sensor to the light source to a different angle. Depending on the area of illumination used and relative brightness of the illumination, the defect could be lighter, darker or nulled for that pixel. A continuous illumination profile (e.g., illumination intensity) could be created, for example using a diffusion light plate but the nulling tuning would be challenging and provide little benefit. Second, a practical lens of this size and focal length will have serious aberrations. Thus, it will be impossible to make an illumination region too narrowly with consistency across the image area.

It is also disclosed herein that the center illumination region 322 can be segmented into a plurality of illumination regions. For example, the center illumination region can include a round center portion that is fully or partially encircled by one or more perimeter (e.g., ring) portions. For a single exposure (i.e., single-snap image processing), more than two illumination regions will allow for a more tailored illumination profile and for better surface defect nulling. In a multiple exposures (i.e., multi-snap image processing), multiple illumination regions and, optionally, illumination intensity and/or duration of illumination for each one of a plurality of respective image capture instances (i.e., snaps) can create additional information that can be combined more efficiently and effectively to null out surface defects.

In the context of embodiment of the present invention, combining illumination regions refers to adding the illumination regions with ratios that effectively removes surface defects. This can be done either as a single exposure by adjusting the illumination intensity in each illumination region (with two or more illumination regions simultaneously illuminated) or algorithmically with multiple exposures with different illumination regions having different illumination profiles such that each exposure is a least partially orthogonal to other exposures. In the context of algorithmically combining illumination regions with multiple exposures, illumination profile refers to illumination intensity (e.g., brightness), duration of illumination, or both. In the context of single exposure image processing as disclosed herein, illumination profile refers to illumination intensity (e.g., brightness) for a particular one of the plurality of illumination regions.

Given a theoretical illumination from all angles, a surface defect will not be visible (or at least significantly less visible) because the loss of intensity due to of a light ray's deflection (or that of a plurality of light rays' deflections) by the defect will be replaced by some other light ray (or that of a plurality of other light rays) from another angle that will deflected into the image capture sensor. This effect is depicted in FIG. 4b. An illumination apparatus 450 has a first illumination region 452 (e.g., having a plurality of first light sources) and a second illumination region 454 (e.g., having a plurality of second light sources) that is spatially offset from the first illumination region 452. The illumination apparatus 450 is configured for enabling the first illumination region 452 and the second illumination region 454 to be selectively activated simultaneously with different illumination intensity (e.g., for a single-snap image processing) or activated independently at the same or different illumination intensity (e.g., multi-snap image processing). A film 455 having a surface defect 456 is positioned between the illumination apparatus 450 and a digital image capture device 458. All or a portion of a first illumination region light ray 460 (i.e., emitted from the first illumination region 452) is deflected by the defect 456 (i.e., first deflected light ray 460') and is not captured at an imaging location L1 of the digital image capture device 458 that is intersected by a coincidental axis A1 defined by the light ray 460. However, all or a portion of a second illumination region light ray 462 (i.e., emitted from the second illumination region 454) is deflected by the defect 456 (i.e., second deflected light ray 462') in a manner whereby it is captured at the imaging location L1 of the digital image capture device 458. The summation of light rays being capture by the digital image capture device 458 in an omni directional illumination system will produce a digital image that is free of surface defects representations or that exhibits fewer/less pronounced surface defect representations. For example, in single-snap image processing, differential illumination intensity between the light emitted from the first illumination region 452 and the second illumination region 454 (e.g., a greater intensity (e.g., volume) of light from the second illumination region 454 than from the first illumination region 452) provides for loss of captured light intensity at the imaging location L1 of the digital image capture device 458 due to the first deflected light ray 460' being fully or partially replaced by the second deflected light ray 462'.

In an illumination system that does not cover the surface defect from all angles, the illumination from obtuse angles can be increased in weighting when combined with the illumination from other regions to compensate for the missing illumination angles. Because both surface defects and image content exist in the captured digital image when using any or all the illumination regions in a non-omnidirectional illumination system, the surface defects need to be nulled. Nulling in the context of the present invention refers to an appearance of a defect on a surface of an optical substrate that carries image content (e.g., a film) being eliminated or significantly reduced relative to the image content in a digital representation of the image without affecting (e.g., adversely affecting) the image content.

The above disclosure relates to a statically set illumination ratio between a perimeter illumination region and center illumination region of an illumination apparatus configured in accordance with an embodiment of the present invention. The resulting defect correction relies on an 'on-average' correction for various sizes and types of defects resulting from a statically set illumination ratio between a perimeter illumination region and center illumination region of an illumination apparatus (i.e., illumination ratio not adjusted on a per-image basis). However, it is disclosed herein that an optimum or preferred ratio of lighting (i.e., illumination ratio(s) can be selected manually by providing a user control of brightness for each illumination region of an illumination apparatus configured in accordance with an embodiment of the present invention. For example, an illumination level of each one of the illumination regions 320, 322, 410 and 412 of the illumination apparatus shown in FIG. 4 can be selectively set. A user can then selectively null different depths and types of defects visually by determining a subjective optimum (e.g., visually preferred) compromise between various ratios/combinations of illumination profiles (e.g., illumination intensities). The advantage of this manual nulling over a system fixed during manufacture and/or scanner set-up is that the nulling can be customized for each film and the type of defects most prevalent in that film. The setting can then be applied to the rest of the film.

Presented now is a discussion of an approach (e.g., manual and/or computer implemented algorithms) for selectively nulling defects through per-defect or per image adjustment of an optical substrate illumination apparatus configured in accordance with an embodiment of the present invention. The optimum ratio of lighting described above can be selected manually by providing a user control of brightness for each segment and a view screen of the captured image. The user then nulls the different depths and types of defects visually, determining a subjective optimum compromise. The advantage of this manual nulling over a system fixed during manufacture is that the nulling can be customized for each optical substrate and the type of defects most prevalent in that optical substrate. The setting can then be applied to the rest of the optical substrate or the process can be repeated on a per-defect and/or per-image basis.

Figure 5:
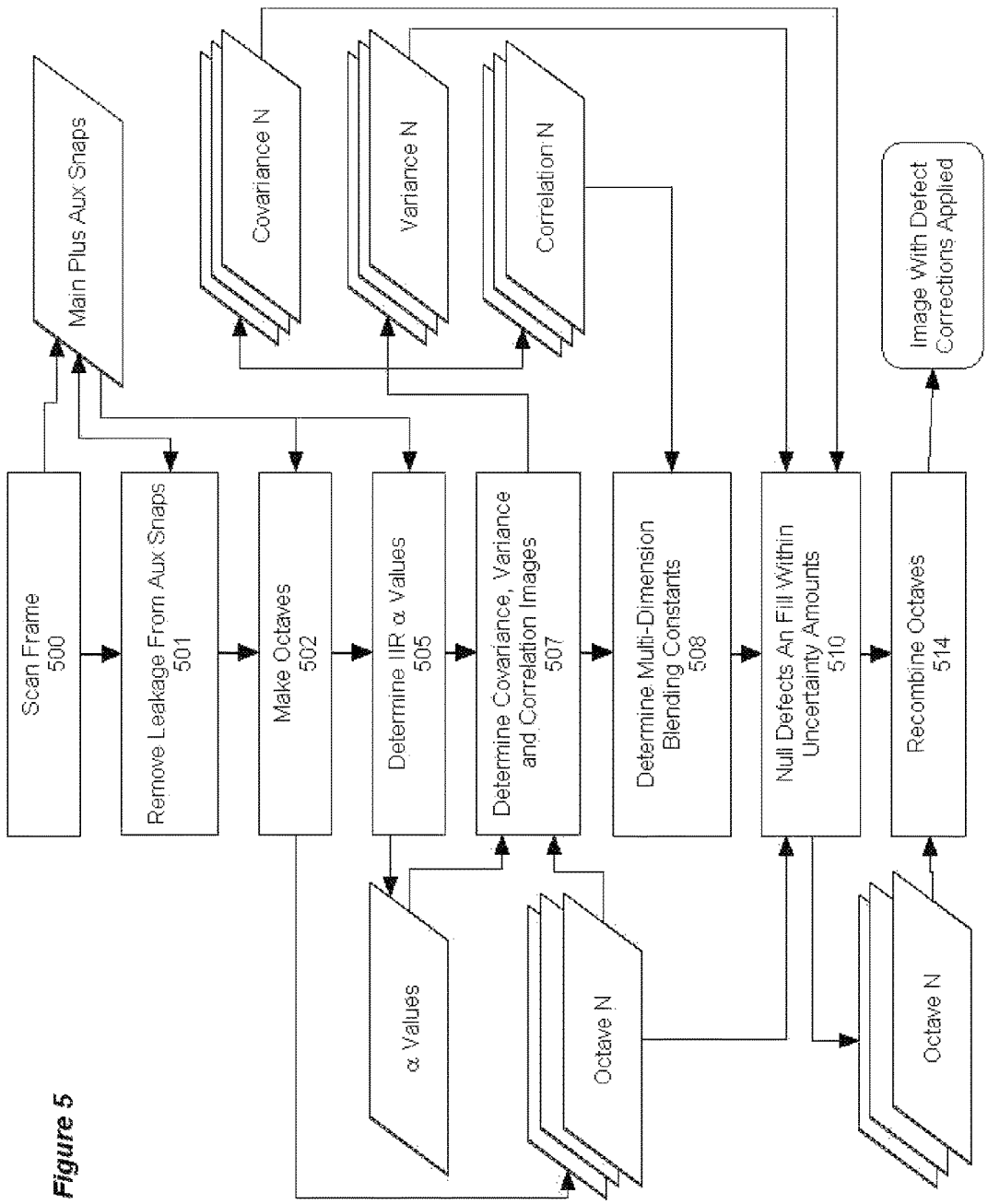
FIG. 5 is a flow diagram view showing a defect nulling algorithm configured in accordance with the present invention.

Referring to FIG. 5, implementations of embodiments of the present invention can involve capturing multiple images (i.e., frame scans), or "snaps" (block 500), each with a different illumination profile (i.e., light emitting) configuration of an illumination apparatus, thereby enabling multi-snap image processing capability. A snap is defined as a single digital scan of a film frame image. These additional snaps are referred to as axillary snaps (block 501). A snap may have a single monochrome channel or Bayer array channel. For example, in a two-segment system, one might capture a snap with just the center and another with just the side. Alternately, one might capture a snap with the center and side both on, with the side at twice the intensity for first-estimate optimization, then a snap with just the side on. Although the second option has different advantages as to noise, dynamic range, and heating of the illumination system, it will be appreciated that they are mathematically equivalent and any other combination can be derived if the snaps have illumination profiles that are independent or partially independent. One example of non-independent snaps is when all the light sources were illuminated (e.g., energized) with intensity X for the first snap and all the light sources were illuminated with an intensity 2X for the second snap. The two captures would not be orthogonal and the second snap would not provide additional information.

Using these multiple snaps, software algorithms can be used to optimize the ratios using best-fit methods or another suitable approach. A measurement of 'fit' is a pixel by pixel cross-correlation of two images. To 'fit' one image to another in this sense one would find a gain to apply a first image into a second image such that the cross-correlation of the first and second image is zero, that is, the two images are statistically independent. Therefore, if one image is of the defects and it has no correlation with the second image into which the first image has been applied, then the defects have been optimally nulled out of the second image in a statistical sense. This has the advantage of allowing a best fit for each frame of a film. With regard to the illumination apparatus 400 discussed above in reference to FIG. 4a, image content captured by using the perimeter illumination region 320 can be essentially eliminated by matching the intensity curves of the image captured by the center illumination region 322 and the image captured by the perimeter illumination region 320 and optionally compensating for average regional intensities differences. Additionally if the outer ring is divided into 2 illumination regions, (left plus right 410 and top plus bottom 412), the two images can be digitally combined to create an image content free of defects. Isolating the defects from the image allows for removing the residual defects from the image captured using the center illumination region 322. Separating the left/right 410 and top/bottom 412 illumination regions provides a further isolation of scratches. Scratches that run along the length of film are common and are more noticeable than other types of surface defects. Isolating scratches allows for more robust algorithms to null out the scratches. The multiple snaps using different illumination segments is expandable to many segments and snaps.

As an accommodation to expense and need for speed, it is possible for different illumination regions of an illumination apparatus configured in accordance with the present invention (e.g., the central illumination region 322 and perimeter illumination region 320 of the illumination apparatus 400) to be different colors. Because image resolution comes predominately from the center illumination region and red usually shows less of the defects by the nature of both refraction and diffraction and any colorant in dust, a preferred combination would use white light for the center disk and red light for the outer ring. For horizontal and vertical segregation, horizontal could be red and vertical blue, although many other combinations are possible. The camera could then use an existing Bayer (color) sensor. Because the center ring is white, the full resolution is realized with no de-rating, taking into consideration the Bayer matrix, which is well known in the art. At the same time the outer ring is captured independently, with defects coded into the Bayer matrix analogous to the way color was encoded into an color television signal, which his also well known in the art. The advantage of this approach is that two or three snaps are captured in one image with virtually no loss of quality. Another advantage is that common color sensors are available for lower cost than specialized monochrome sensors. A disadvantage is that the camera lens must be free of chromatic aberrations or correctable in software.

A further software refinement uses the multiple snaps to find an optimum nulling region by region. Blending constants are computed from the relationship of the illumination snaps, as shown in FIG. 5. The covariance of a snap and the variance and correlation (block 504) between snaps can be used to determine these blending constants (block 508). After removing the image content from the outer image(s), these defect images are regionally compared to the inner image. These illumination regions can be overlapping and change dynamically in this example. The cross correlation and autocorrelation terms, which are well known to those skilled in the art, can each be found pixel by pixel, and then diffuse averaged using a window with a very wide skirt, for example an eight pass one dimensional exponential Infinite Impulse Response "IIR" filter (block 506). The IIR filter constant will spatially vary depending on the defect activity for that area of the image. The α referred to in the IIR process block 506 in FIG. 5 is based on this defect activities. This is easier to implement with the IIR filter but does not exclude using another type of filter. When the diffused cross correlation is divided by the diffused autocorrelation to determine optimum nulling, the result can change rapidly between strong details, allowing close strong defects to each receive their own customized nulling coefficient. However in areas with no defects the average nulling of adjacent strong details will be swept in to prevent random noise from giving a false result. This technique has the important advantage that defects, particularly stronger noticeable defects, are individually nulled optimally, and thus any differences between defect depth or class, such as scratches or surface dust, are accommodated for noticeable defects. Nulling pulls the image content back from under the defect. If a pixel is attenuated by 50% by the defect, the nulling will double the intensity. The defect images can be from a single color light or multiple colors. The correlation with the image that has both image and defect will determine how much nulling in each color is needed if the image is a colored image.

Figure 6:
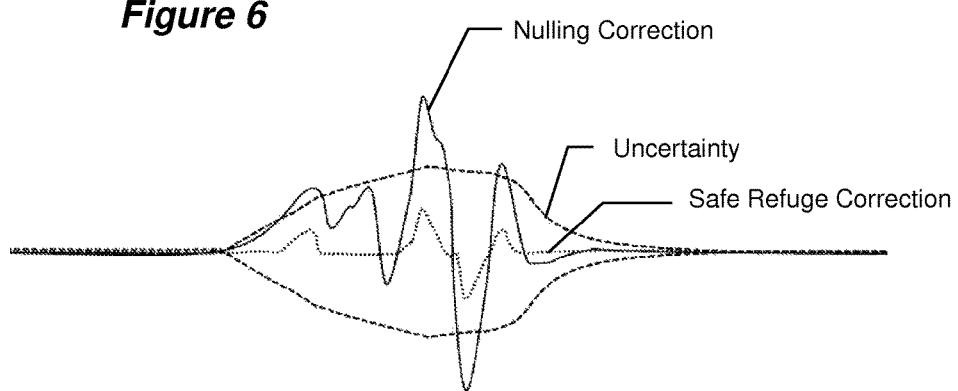
FIG. 6 is a diagrammatic view showing a "safe refuge" portion of a high frequency range on an image scan for a defect nulling algorithm configured in accordance with the present invention.

A further software refinement first divides the images from each snap into high and low frequencies or octaves (block 502). The blending constants have the added dimension of frequency bands. The low-pass image is processed as before, but potentially can be processed faster as a downsized image. The high pass image can be processed as before removing the defects from the captured image, but potentially can be done better because, since each region averages to zero in a high-pass image, the auto and cross correlations are simplified because they do not have to account for the "DC" constant (fixed offset) term. Also, in a high pass image, zero is a "safe refuge" as shown in FIG. 6. By painting zero on several pixels, after recombining the frequencies, the zero simply reveals the blurred low-pass image underneath, which is usually not visually noticeable over small areas. This is equivalent to pixel fill but only on the residual defect remaining within the uncertainty after recreating the proper intensity for the pixel at the defect with the nulling operation. This "safe refuge" characteristic can be used in a very important way. From the multiple snaps it is possible to get an estimate of the strength of a defect and null it, as described above in the previous paragraph. However there will always be "sparkle" and "speckle" as described above, and other statistical uncertainties in the nulling. It is possible to estimate this uncertainty based on the variance terms or simply as a percent of the total estimated defect intensity, and then drive toward the zero "safe refuge" by exactly this amount, and no more. This is a juried fill that only shaves off defect overage, only by the amount of overage calculated as the uncertainty, and only where there is a defect with a calculated uncertainty. The calculated degree of uncertainty can be grown outward a limited amount, for example by two pixels, to remove fringing around defects. This growth accommodates shading and registration between snaps caused by camera vibration, speckle, or just light parallax between angles.

A further software refinement divides the image, not just into a high and low frequency band, but also into a full pyramid of bands. Shown in FIG. 5 for example are octave bands (block 502). This has a strong advantage of nulling each band separately to articulate around sparkle and to minimize artifacts. Further, this allows a select amount of erasure toward zero, growth, and other parameters unique to each band. Thus the refuge to zero may be applied strongly at high frequencies infested with defects, but minimally in low frequencies where most of the image resides. Further, information can be shared between bands. For example the higher frequencies have more defects and less image, so are more reliable indicators of optimal nulling than when statistically combined with lower bands. This sharing of information can be made more valuable by pyramid construction filters that segregate defects more strongly into the high frequencies and image detail, particularly edges, into lower frequencies. For example, a median low-pass has this characteristic over a conventional Laplacian low-pass. Building a pyramid with medians also reduces the defect residue in more visible lower frequencies, allowing more efficient defect nulling with less residue.

The film is scanned with N+1 snaps. One snap contains the image content plus some remaining defects. The other snaps contain more of the defects but also some leakage of the image content. The leakage is removed from these defect images to provide purified defect images. The octave frequency component images are created from each of the snaps. So there is a unique set of images for each snap. Lower octaves can be downsized to save space.

An IIR filter (block 505) is used with a width or filter constant that is related to the defect activity. To calculate the covariances, variances, and correlations, the area used needs to be the same (block 507). The area used is related to the defect activity. The higher the activity the smaller the area used to catch more of the relationship between the images. When there is more than one snap representing the defects, the amount used from each snap in nulling out the defect is determined optimally by the relationship between these defect snaps.

The defects in the image content snap are nulled out in each octave using the defect snaps. As shown in the process block called "Null defects and fill within uncertainty amounts" (block 510), the nulled defects in the high pass image content snaps are further processed by falling back to zero for any nulling that falls within the uncertainty of the correction and only allowing corrections from zero by the amount that the nulling is outside the uncertainty of the correction (shown in FIG. 6). This is a removal of the residual after the surface defect is nulled at each octave level. The nulling has noise or uncertainty and the correction could be under or over within this uncertainty. Because these images are bandpass images, zero is a complete removal of any information at the pixel for that octave. So if uncertain, going to zero is the best guess and subtracting off the uncertainty for nullings that exceed the uncertainty is a reasonable approach. The image content snap frequency bands (or octaves) are recombined (block 514) to form a single image with the defects corrected, as shown in FIG. 5.

Some embodiments of the present invention can be a non-transitory computer-readable medium having tangibly embodied thereon and accessible therefrom processor-interpretable information defining a displayable visual experience (e.g., a movie). Such a movie comprises a plurality of digital images each generated by subjecting a plurality of images carried by a film to an image processing method configured in accordance with the present invention. For example, the images carried by a film can be processed for the purpose of nulling (e.g., significantly reducing) the visual appearance of a defect in the film as captured in a digital representation thereof (i.e., as produced using a method in accordance with an embodiment of the present invention (e.g., shown in FIG. 5)). The processor-interpretable information can be interpreted by a data processor of a digital media playback system (e.g., a data processing apparatus (e.g., computer) of a projection system) with corresponding images defined by such processor-interpretable information being outputted via an image projection system. In one embodiment, the non-transitory computer-readable medium includes a memory device and a memory device interface (e.g., data access port) coupled thereto. The processor-interpretable information is tangibly embodied on (i.e., stored on) the memory device and is accessible therefrom via the memory device interface.

It is disclosed that the disclosures made herein can be readily applies to both black and white (B&W) images as well as color images. In the case of B&W images, a single color of light is required for illuminating the images with only a single image capture process (i.e., light source illumination and image generation) being required. In the case of color images, a plurality of image capture processes is required. More specifically, for color images, each color of an image will require illumination of a light source of a required color followed by a corresponding image generation). This plurality of image capture processes can all be performed with the film positioned at a single digital scanning station (i.e., a multi-color illumination apparatus and multi-color digitizing apparatus). Optionally, the image capture process for each color of the image can be performed at a respective one of a plurality of digital scanning stations (i.e., by moving the image from one digital scanning station to the next). Because a defect is physically on the film, it affects all colors in embodiments of image processing of color film. Further, most defects affect all colors generally by the same proportion. Therefore, when scanning color film in three colors of light, only one differential light exposure is required to identify the defects and apply them to one color, and then the correction for each defect may be applied in proportion to the other colors. A well-known example of this is Digital ICE® brand technology, which is commercially available from Image Trends Incorporate, in which one defect record is obtained with infrared, and then that single defect record is applied in proportion to red, green, and blue exposures.

It is also disclosed herein that the utility of embodiments of the present invention are not limited to defect nulling. In view of the disclosures made herein, a skilled person will appreciate uses for embodiments of the present invention that are not directed to or for the benefit of defect nulling. For example, a system of and/or method for digitizing an image carried by a film can be used for affecting a resulting digital representation of such image such as to create a resultant effect of an altered contrast ratio of all or a portion of the image.

In view of the disclosures made herein, a skilled person will appreciate that embodiments of the present invention are not limited to a particular type or configuration of film scanning equipment, to a particular form factor of film (e.g. microfiche, large format), or to film as referred to in a traditional sense. Furthermore, a skilled person will appreciate that film in the context of the present invention is a transparent (fully, partially, optically, etc) substrate such as would be a microscope slide. In a broad sense, such a substrate is defined herein to be an optical substrate.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in all its aspects. Although the invention has been described with reference to particular means, materials and embodiments, the invention is not intended to be limited to the particulars disclosed; rather, the invention extends to all functionally equivalent technologies, structures, methods and uses such as are within the scope of the appended claims.

What is claimed is:

1. A system for digitizing an image carried within an image area of an optical substrate, comprising:
    a digitizing apparatus including a digital image capture device and a lens for focusing first and second portions of imaging light received thereby onto the digital image capture device for being sensed thereby;
    an illumination apparatus adapted to emit the first portion of said imaging light and to emit the second portion of said imaging light, wherein the first and second portions of said imaging light are the same color; and
    an optical substrate handling apparatus adapted to transport the optical substrate relative to the digitizing apparatus along a path that extends between the digitizing apparatus and the illumination apparatus, wherein the optical substrate carries a defect within the image area thereof, wherein the first portion of said imaging light is emitted from a different location than the second portion of said imaging light in relation of the digital image capture device whereby at least a portion of the first portion of said imaging light impinges upon the defect from a different angle than any portion of the second portion of said imaging light;
    wherein said imaging light emitted from the first and second portions of the illumination apparatus are combined at a light receiving portion of the digital image capture device thereby providing for a visual appearance of the defect to be nullified within a composite digital representation of the image that is generated using information outputted from the digital image capture.

2. The system of claim 1 wherein the illumination apparatus is adapted to at least one of:
    independently emit the first portion of said imaging light and the second portion of said imaging light each from within a respective one of two different illumination regions; and
    simultaneously emit the first portion of said imaging light and the second portion of said imaging light each from within a respective one of two different illumination regions with the first portion of said imaging light exhibiting substantially different illumination intensity with respect to the first portion of said imaging light.

3. The system of claim 1 wherein:
    the illumination apparatus comprises a first light source and a second light source; and
    the first light source is located within a first illumination region of the illumination apparatus and is adapted to emit the first portion of said imaging light;
    the second light source is located within a second illumination region of the illumination apparatus that is at least partially outside of an area of the first illumination region and is adapted to emit the second portion of said imaging light.

4. The system of claim 1 wherein:
    the illumination apparatus is adapted to independently emit the first portion of said imaging light and the second portion of said imaging light each from within a respective one of two different illumination regions; and
    the digital image capture device and the illumination apparatus being jointly operable for enabling the digital image capture device to output a respective digital representation of the image during independent emitting of the first and second portions of said imaging light.

5. A method for digitizing an image carried by an optical substrate, comprising:
    positioning the image carried by the optical substrate within a field of view of a digital image capture device, wherein the optical substrate includes a defect within an image area thereof;
    exposing the image to light from a first light source that is located away from a first side of the optical substrate at a first location, wherein said light of the first light source is of a particular color;
    exposing the image to light from a second light source that is located away from the first side of the optical substrate at a second location different than the first location whereby at least a portion of said light of the first source impinges upon the defect from a different angle than any portion of said light of the second light source, wherein said light of the second light source is of the particular color such that said light of the first light source and said light of the second light sources are the same color;

activating the digital image capture device includes outputting a first digital representation of the image while exposing the image to the light from the first light source and outputting a second digital representation of the image while exposing the image to one of only the light from the second light source and both the light from the first and second light sources, wherein imaging light produced by the first and second light sources passing through the optical substrate is received at a common imaging light receiving portion of the digital image capture device; and digitally combining the first and second digital representations of the image to produce a composite digital representation of the image whereby said generation of the first and second digital representations of the image using the imaging light from the first and second light sources and said digitally combining jointly causes a visual appearance of the defect to be nullified within the composite digital representation of the image.

6. The method of claim 5 wherein:

exposing the image to said light from the first light source and exposing the image to said light from the second light source are performed in a sequential manner; and activating the digital image capture device while exposing the image to said light from the first and second light sources includes outputting a first digital representation of the image while exposing the image to only said light from the first light source and outputting a second digital representation of the image while exposing the image to one of only said light from the second light source and both said light from the first and second light sources.

7. The method of claim 5 wherein:

exposing the image to said light from the first light source and exposing the image to said light from the second light source includes the first light source and the second light source being that of an illumination apparatus having the first and second light sources simultaneously energized; and an illumination intensity of the first portion of said imaging light is substantially different than an illumination intensity of the second portion of said imaging light.

8. The method of claim 5 wherein an illumination intensity of said light from the first light source is substantially different than an illumination intensity of said light from the second light source.

9. A non-transitory computer-readable medium having tangibly embodied thereon and accessible therefrom processor-interpretable information defining a displayable visual experience, the non-transitory computer-readable medium is adapted to:

provide each one of a plurality of images of the processor-interpretable information in a digital format to at least one processor of a digital media playback system, wherein each one of said digital format images is generated from a respective one of a plurality of images carried by an optical substrate, wherein one or more of the digital format images is generated using a method comprising:

positioning the image carried by the optical substrate within a field of view of a digital image capture device, wherein the optical substrate includes a defect within an image area thereof;

exposing the image to light from a first light source that is located away from a first side of the optical substrate at a first location, wherein said light of the first light source is of a particular color;

exposing the image to light from a second light source that is located away from the first side of the optical substrate at a second location different than the first location whereby at least a portion of said light of the first source impinges upon the defect from a different angle than any portion of said light of the second light source, wherein said light of the second light source is of the particular color such that said light of the first light source and said light of the second light sources are the same color;

activating the digital image capture device includes outputting a first digital representation of the image while exposing the image to the light from the first light source and outputting a second digital representation of the image while exposing the image to one of only the light from the second light source and both the light from the first and second light sources, wherein imaging light produced by the first and second light sources passing through the optical substrate is received at a common imaging light receiving portion of the digital image capture device; and digitally combining the first and second digital representations of the image to produce a composite digital representation of the image whereby said generation of the first and second digital representations of the image using the imaging light from the first and second light sources and said digitally combining jointly causes a visual appearance of the defect to be nullified within the composite digital representation of the image.

10. The non-transitory computer-readable medium of claim 9 wherein:

exposing the image to said light from the first light source and exposing the image to said light from the second light source includes the first light source and the second light source being that of an illumination apparatus having the first and second light sources simultaneously energized; and an illumination intensity of the first portion of said imaging light is substantially different than an illumination intensity of the second portion of said imaging light.

11. The non-transitory computer-readable medium of claim 9 wherein:

exposing the image to said light from the first light source and exposing the image to said light from the second light source are performed in a sequential manner; and activating the digital image capture device while exposing the image to said light from the first and second light source includes outputting a first digital representation of the image while exposing the image to only said light from the first light source and outputting a second digital representation of the image while exposing the image to one of only said light from the second light source and both said light from the first and second light sources.

12. The non-transitory computer-readable medium of claim 11 wherein:

exposing the image to said light from the first light source and exposing the image to said light from the second light source includes the first light source and the second light source being that of an illumination apparatus having the first and second light sources simultaneously energized; and an illumination intensity of the first portion of said imaging light is substantially different than an illumination intensity of the second portion of said imaging light.

* * * * *